(12) United States Patent
Kocher et al.

(10) Patent No.: US 7,117,044 B2
(45) Date of Patent: Oct. 3, 2006

(54) ALTERNATIVE ENERGY SYSTEM CONTROL METHOD AND APPARATUS

(75) Inventors: Mark John Kocher, Raleigh, NC (US); Gerald Benjamin Carson, Raleigh, NC (US)

(73) Assignee: Square D Company, Palatine, IL (US)

( * ) Notice: Subject to any disclaimer, the term of this patent is extended or adjusted under 35 U.S.C. 154(b) by 354 days.

(21) Appl. No.: 10/748,741

(22) Filed: Dec. 30, 2003

(65) Prior Publication Data

US 2005/0143846 A1 Jun. 30, 2005

(51) Int. Cl.
G05B 13/02 (2006.01)

(52) U.S. Cl. .................. 700/34; 700/295; 700/297; 700/298

(58) Field of Classification Search .................. 700/34, 700/41, 42, 43, 52, 53, 73, 74, 286, 295, 700/297, 298
See application file for complete search history.

(56) References Cited

U.S. PATENT DOCUMENTS

| | | | | |
|---|---|---|---|---|
| 5,850,113 A | * | 12/1998 | Weimer et al. | 307/125 |
| 5,914,542 A | * | 6/1999 | Weimer et al. | 307/125 |
| 5,982,156 A | * | 11/1999 | Weimer et al. | 323/222 |
| 6,214,484 B1 | * | 4/2001 | Hauer | 429/9 |
| 6,369,461 B1 | * | 4/2002 | Jungreis et al. | 307/46 |
| 6,487,096 B1 | | 11/2002 | Gilbreth et al. | |
| 6,495,277 B1 | * | 12/2002 | Edlund et al. | 429/22 |
| 6,573,682 B1 | | 6/2003 | Pearson | |
| 6,765,315 B1 | * | 7/2004 | Hammerstrom et al. | 307/66 |
| 6,901,300 B1 | * | 5/2005 | Blevins et al. | 700/46 |
| 6,901,560 B1 | * | 5/2005 | Guerlain et al. | 715/833 |
| 2002/0151987 A1 | * | 10/2002 | Mendez | 700/8 |

* cited by examiner

Primary Examiner—Thomas Pham

(57) ABSTRACT

A multivariable control system provides regulation for a plurality of control variables of interest based on selecting a particular one of the variables for regulation relative to a corresponding setpoint, while continuing to monitor the other variables and switching regulation control over to another one of the variables as needed to maintain all of them within their allowed ranges. The system includes one or more PID regulators that tune themselves for the particular variables selected for regulation control. In an exemplary embodiment, the control system is configured for controlling an alternative energy system, wherein it includes one or more power flow devices that control power flow between electrical energy storage devices (EESDs) and a common dc bus and/or power flow between the dc bus and an external ac electrical system.

46 Claims, 8 Drawing Sheets

ALTERNATIVE ENERGY SYSTEM CONTROL METHOD AND APPARATUS

BACKGROUND OF THE INVENTION

The present invention generally relates to alternative energy systems, and particularly relates to the control of such systems.

Alternative energy systems represent an increasingly viable alternative to or supplement to conventional utility grid power. For example, advancements in power generation and control technologies have increased the power density and reliability of fuel cell based generation systems such that those types of systems are increasingly realistic for use in providing localized power for residences and small business, and even in providing opportunities for cogeneration wherein a grid-connected alternative energy system injects a portion of its output power into the utility grid.

Typically, such systems convert dc power from a fuel cell (or other local source) into ac power using a power inverter. Further, such systems typically include one or more batteries to provide backup power, and, at least on a temporary basis, to provide higher power than can be provided by the primary source, e.g., fuel cell. As such, the typical alternative energy system includes multiple energy sources (e.g. fuel cell and backup batteries) and it is necessary to be able to regulate more than one power system variable. Examples of variables of interest include, but are not limited to, fuel cell current, battery current and/or voltage, and dc bus voltage.

Controlling such systems based on a plurality of different, potentially conflicting, system variables presents a significant control challenge, particularly where the systems operate in and switch between a variety of modes, such as stand alone, grid-connected, etc. For example, in certain operating modes, there can be one or a limited number of control elements within the system that can be used to effect the desired regulation.

SUMMARY OF THE INVENTION

The present invention comprises a method and apparatus to control a multi-variable system using a common control component, wherein control monitoring and selection logic selects the control variable to be regulated based on desired control modes and the states of monitored variables. An exemplary system combines a plurality of control loops into a common control circuit that is configured with the appropriate control response, e.g., gains, delays, filtering, etc., in consideration of the control variable to be regulated.

Although the overall control loop is closed through only one feedback variable at a time, i.e., the regulation response is directed to a selected control variable, the exemplary apparatus continues monitoring all control variables of interest to determine whether any enters a disallowed or out-of-bounds condition. If so, the apparatus can change its control to regulation of the out-of-bounds variable and it can include logic to establish a hierarchy or priority of control to determine which variable takes precedence in terms of its selection for out-of-bounds control.

In an exemplary embodiment, the present invention comprises a method of controlling a multivariable system, such as an alternative energy system, wherein the method comprises monitoring a plurality of control variables of interest in the system, selecting one of the control variables for regulation control and regulating the selected control variable relative to a desired setpoint while continuing to monitor the remaining ones of the control variables, and selectively switching regulation control over to one of the remaining ones of the control variables and regulating that control variable relative to a desired setpoint if that control variable is detected as exceeding its allowed value. For example, a multivariable controller can regulate one of battery voltage, battery current, fuel cell current, internal dc bus voltage, etc., and selectively switch from regulating one of those variables to another one based on a desired operating mode and based on whether any of them exceeds allowable operating limits.

In one embodiment, the above exemplary method or variations thereof are implemented as computer program instructions stored in a computer readable medium for execution by, for example, a Digital Signal Processor (DSP) or other microprocessor or logic-based circuit. As such, exemplary processing logic associated with the present invention can be wholly or partly implemented in the digital processing domain.

In another exemplary embodiment, the present invention comprises an alternative energy system control apparatus. The exemplary apparatus comprises a bi-directional converter to couple one or more batteries to a dc bus included within the apparatus, a reverse blocking circuit to couple a fuel cell to the dc bus, a power inverter circuit to generate ac output power from dc power on the dc bus, and a multivariable control circuit configured to select one from a set of control variables for regulation control relative to a corresponding desired setpoint while continuing to monitor remaining ones of the control variables. An exemplary set of control variables comprises two or more ones of a fuel cell current, a battery current, a battery voltage, and a dc bus voltage. Further, the exemplary multivariable control circuit is configured to selectively switch regulation control over to another one of the control variables and regulate that control variable relative to a corresponding desired setpoint if that control variable is detected as exceeding an allowed value.

DETAILED DESCRIPTION OF THE INVENTION

Figure 1:
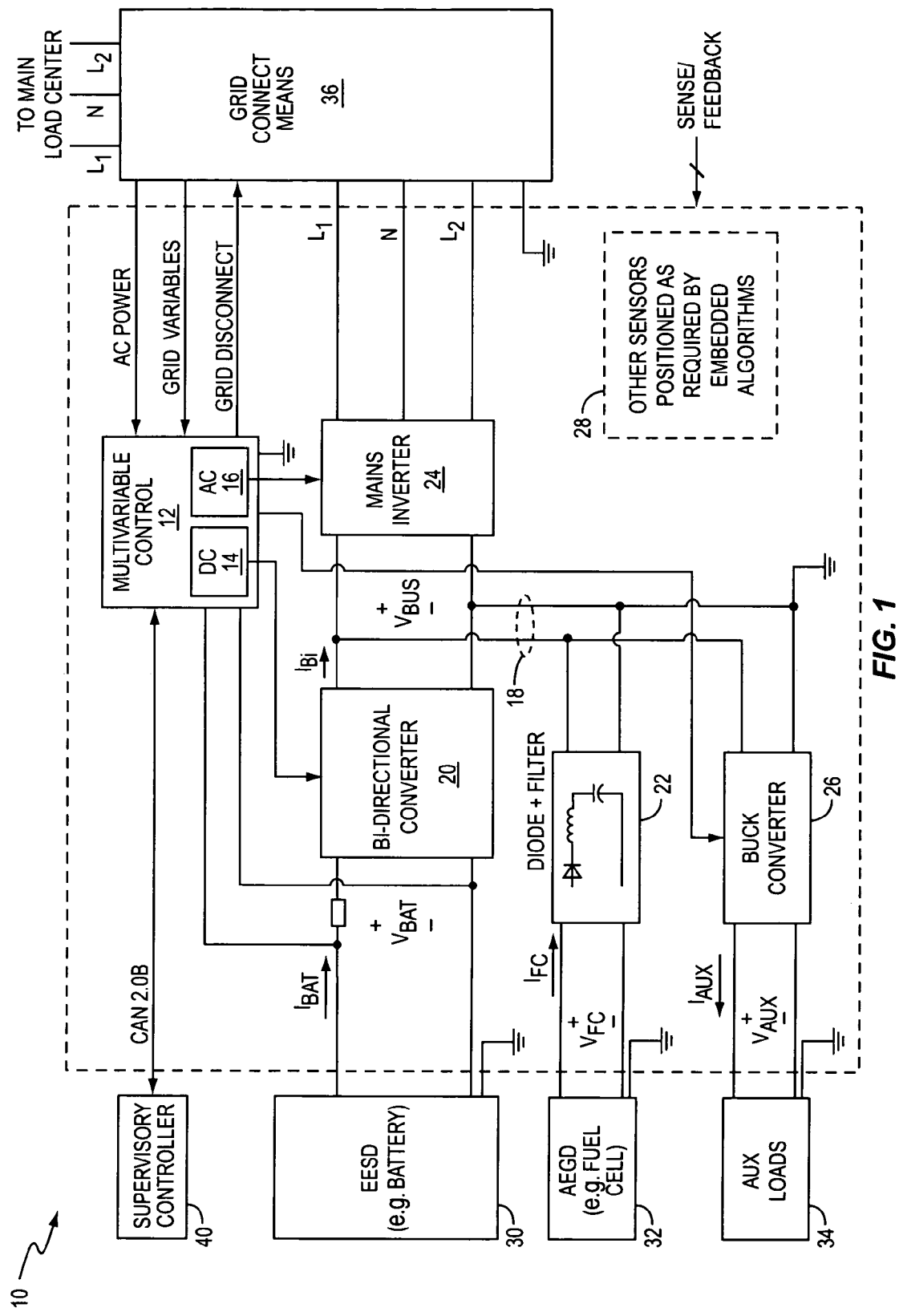
FIG. 1 is a diagram of an exemplary multivariable control system configured as an alternative energy control system according to the present invention.

FIG. 1 illustrates an exemplary multivariable control system 10 that is configured for operation in an alternative energy system. System 10 comprises a multivariable controller 12, that comprises a "dc control" 14 and an "ac control" 16, along with higher level logic controls, a shared (common) dc bus 18, a bi-directional converter 20, a reverse blocking circuit 22, a mains inverter 24, a converter circuit 26, and one or more sensors 28 to support control operations of the system 10. In its alternative energy system configuration, system 10 is associated with battery (or batteries) 30, a fuel cell 32, one or more auxiliary loads 34, grid connect means 36, and a supervisory controller 40. Grid connect means 36 can comprise contactors or the like. Also, although they can comprise other or additional items, the auxiliary loads 34 typically represent elements that provide mechanical support to the fuel cell 32.

It should be understood that system 10 can be associated with essentially any type of electrical energy storage device (EESD) in place of battery 30. For example, energy storage capacitors, or other energy storage elements (electrical, electro-chemical, electro-mechanical, etc.) can be used in place of battery 30. Similarly, system 10 can be associated with essentially any type of alternative energy generation device (AEGD) in place of fuel cell 32. For example, photovoltaic cells, micro-turbines or other type of dc generator, etc., can be used in place of fuel cell 32. Therefore, although batteries and fuel cells are used for simplicity of discussion, the present invention is not limited to the use of those particular types of EESDs and AEGDs. Thus, it should be understood that wherever battery currents and voltages are referred to herein, EESD voltages and currents are more generally implied. The same generality applies to fuel cell currents/voltages with respect to the broader category of AEGDs.

In operation, system 10 responds to overall mode control and other commands as generated by the supervisory controller 40. Supervisory controller 40 can be communicatively coupled to system 10 via a Controller Area Network (CAN) bus for example, or by some other network or signaling interface. Mains inverter 24 in system 10 converts dc power on dc bus 18 into ac output power that is provided to local loads coupled to grid connect means 36. If grid connect means 36 is coupled to a utility grid, such as in a Grid-parallel mode, then some or all of the ac power output by mains inverter 24 can be injected into the grid, which practice often is referred to as co-generation.

The dc power available on dc bus 18 may be provided by battery 30, by fuel cell 32, or by a combination of the battery 30 and fuel cell 32. As will be explained in much greater detail later herein, multivariable controller 12 is configured to control the amount of current delivered to dc bus 18 by the bi-directional converter 20 based on regulating a selected control variable relative to a desired setpoint for that variable. Thus, as configured, system 10 comprises an alternative energy system associated with multiple energy sources (e.g. battery 30 and fuel cell 32) and it is necessary for it to be able to regulate more than one power system control variable. Examples of such control variables include two or more of these items: fuel cell current ($I_{FC}$), battery current ($I_{BAT}$), battery voltage ($V_{BAT}$), and dc bus voltage ($V_{BUS}$). With the illustrated configuration, the controller 12 can control bi-directional converter 20 to control any one of the aforementioned variables, although the particular one of the control variables selected for setpoint regulation control is determined at least in part by the commanded mode information from supervisory controller 40.

More generally, the present invention provides a method of simultaneously monitoring multiple system variables, and of selecting one of said multiple variables for regulation. The exemplary control then regulates the selected variable relative to a desired setpoint, while continuing to monitor the other system variables. If any one of remaining system variables exceeds a maximum allowable operating condition, the control switches over to regulate that new variable relative to its corresponding desired setpoint. An order-of-control precedence can be established for deciding which variable to regulate, if more than one variable exceeds its maximum allowable operating condition.

With this multivariable control approach, system 10 can be configured to charge the battery 30 (in either current regulation or voltage regulation mode), regulate current from the fuel cell 32, or regulate the dc bus voltage of bus 18. In most operating modes, the bi-directional converter 20 acts as the single independent power control device for system 10, and it can be controlled to effect regulation control of the selected control variable. That is, in most operating modes, the only available control handle for regulating the exemplary system variables is the bi-directional converter 20. The bi-directional converter 20 thus is controlled in such a way as to deliver a set amount of current, $I_{Bi}$, to the dc bus 18, and the control variable $I_{Bi}$ is in turn used to regulate the other system variables.

Table 1 presented below outlines exemplary control modes for system 10. Table 1 outlines the major control modes of the exemplary system 10, as well as the preferred control variable setpoint values corresponding to each mode. Transitions between the different control modes primarily are dictated by commands from the supervisory controller 40, but also are partly dependent on certain automatic decisions made by the system 10.

TABLE 1

| Mode | $V_{BUS\_CMD}$ | $I_{FC\_CMD}$ | $V_{BAT\_CMD}$ | $I_{BAT\_CMD}$ | |
|---|---|---|---|---|---|
| Offline | — | — | — | — | Power Electronics disabled |
| Standby | max $V_{BUS}$ | 0 | max $V_{BAT}$ | 0 | $I_{Bi} = I_{AUX}$ |
| Idle | min $V_{BUS}$ | $I_{FC}*$ | $V_{BAT}*$ | $I_{BAT}*$ | Charge batteries as commanded, subject to $I_{FC}$ and $V_{BUS}$ limits |
| Stand-alone | min $V_{BUS}$ | $I_{FC}*$ | $V_{BAT}*$ | $I_{BAT}*$ | Charge batteries as commanded, subject to $I_{FC}$ and $V_{BUS}$ limits |
| Grid-parallel | (disabled) | (disabled) | $V_{BAT}*$ | $I_{BAT}*$ | Charge batteries as commanded (Inverter regulates $I_{FC}$) |

As will be described in further detail below, the system 10 continuously compares each of the control variables to its assigned setpoint. As a result of these comparisons, the system 10 determines whether each variable is substantially equal to the setpoint (i.e. within a narrow range around the setpoint), or whether the variable is high or low compared to the setpoint. For each variable, one of the high or low conditions represents an allowable operating state, while the other high or low condition represents a disallowed operating state. If any of the variables enters its disallowed state, the control method automatically regulates that variable to bring it back within its allowed operating range. If more than one variable enters a disallowed state, the control selects one of the control variables to regulate based on a pre-determined order of precedence, i.e., a defined priority of regulation. If all of the variables are within their allowable operating ranges, the control either chooses a default variable to regulate, or continues to regulate whichever variable was previously selected for regulation. In this way, the system 10 determines which one of the multiple control variables subject to regulation is most in need of attention, and regulates that variable as needed or as appropriate.

Table 2 presented below summarizes exemplary definitions of allowed and disallowed operating states for the control variables of interest in the context of FIG. 1. Each of the variables is defined to be "in-band" when it is substantially at its associated setpoint. The voltage of dc bus 18, $V_{BUS}$, is allowed to operate above its corresponding setpoint, but not below. Fuel cell current, $I_{FC}$, and battery voltage, $V_{BAT}$, are allowed to operate below their respective setpoints, but not above. The same is true of battery current, $I_{BAT}$, except that the sense of the current is reversed such that positive $I_{BAT}$ represents discharging the battery 30, and therefore $I_{BAT}$ is negative during battery charging. In other words, battery-charging current $(-I_{BAT})$ is allowed to operate below the setpoint, but not above.

TABLE 2

| Control Variable | Allowed ("LO") | At Setpoint ("INBAND") | Disallowed ("HI") |
|---|---|---|---|
| $V_{BUS}$ | $V_{BUS} > V_{BUS}*$ | $V_{BUS} = V_{BUS}*$ | $V_{BUS} < V_{BUS}*$ |
| $I_{FC}$ | $I_{FC} < I_{FC}*$ | $I_{FC} = I_{FC}*$ | $I_{FC} > I_{FC}*$ |
| $V_{BAT}$ | $V_{BAT} < V_{BAT}*$ | $V_{BAT} = V_{BAT}*$ | $V_{BAT} > V_{BAT}*$ |
| $I_{BAT}$ | $(-I_{BAT}) < (-I_{BAT}*)$ | $(-I_{BAT}) = (-I_{BAT}*)$ | $(-I_{BAT}) > (-I_{BAT}*)$ |

In an exemplary "Offline" mode, the fuel cell 32 and the auxiliary loads 34 are de-energized and battery 30 provides the small amount of power necessary to energize the controller 12. Power supplies within system 10 generally are disabled in this mode except for the power supply associated with the processing logic such as controller 12. System 10 operates in the Offline mode prior to startup and after shutdown.

In an exemplary "Standby" mode, the auxiliary loads 34 are energized but the fuel cell 32 and the mains inverter 24 remain de-energized. Battery 30 provides the power required by the auxiliary loads 34 via operation of the bi-directional converter 20, which provides current to or takes current from dc bus 18. System 10 operates in the Standby mode during startup or shutdown of the fuel cell 32, or while fuel cell 32 is being purged of gasses. In Standby mode, the bi-directional converter 20 regulates the dc bus voltage ($V_{BUS}$) at a voltage higher than the terminal voltage of the fuel cell such that the reverse blocking circuit 22 blocks current from flowing into dc bus 18 from fuel cell 32.

Thus, an exemplary blocking circuit 22 includes a series diode that is reverse biased when $V_{BUS}$ is elevated above the terminal voltage of fuel cell 32. Such blocking prevents loading of fuel cell 32 while simultaneously preventing reverse current from flowing into fuel cell 32. As shown in Table 1, the other control variable setpoints can be set to extreme setpoint values, to help ensure that the system 10 continues regulating $V_{BUS}$ and does not attempt to regulate any of the remaining ones of the control variables.

In an exemplary "Idle" mode, the fuel cell 32 is energized and provides power to the auxiliary loads 34, and re-charges the battery 30 as necessary. The mains inverter 24 remains de-energized. The system 10 operates in this mode just prior to activation of the mains inverter 24, or just after the inverter 24 is stopped. In Idle mode, the bi-directional converter 20 can regulate any of the control variables as necessary to meet the requirements set by the supervisory controller 40. The dc bus voltage setpoint is set at about the minimum allowable voltage from the fuel cell 32, so that the system 10 will only attempt to regulate $V_{BUS}$ in the extreme case where the fuel cell 32 is provided with inadequate fuel to support the electrical demand. The fuel cell current setpoint ($I_{FC}*$) is set at the maximum allowable current level established by the supervisory controller 40. The battery charging setpoints ($V_{BAT}*$ and $I_{BAT}*$) are set to the command levels established by the supervisory controller 40. In this manner, system 10 meets the battery charging requirements, unless $V_{BUS}$ or $I_{FC}$ exceed their respective allowable limits.

In an exemplary "Stand-alone" mode, the mains inverter 24 is energized and provides ac power to local loads coupled to grid connect means 36. The fuel cell 32 remains energized and provides power to the local loads (via the inverter 24) and to the auxiliary loads 34. Fuel cell 32 also re-charges the battery 30 as necessary. System 10 operates in Stand-alone mode if the ac mains are not present or if the mains voltage or frequency is detected as being outside of their normal operating limits. In such cases, mains inverter 24 acts as an ac output voltage regulator, and the power drawn at the inverter input terminals from dc bus 18 is dictated by the ac loads placed on the inverter 24. Any short-term ac load power requirements that cannot be met by the fuel cell 32, such as switching on additional loads or supporting load inrush requirements, are provided by the battery 30. Except for inverter 24 being active, system 10 can regulate the control variables the same as it would in the exemplary Idle mode.

In an exemplary Grid-parallel mode, the fuel cell 32 and inverter 24 remain energized. The inverter's ac output is connected in parallel with the ac mains, so that load power requirements are provided by either the mains or by the inverter 24. It is further possible in this mode to operate the inverter 24 so that it provides more power than is required by the local loads, in which case net ac power is delivered (injected) into the ac mains. It is also possible to operate the inverter 24 so that power from the mains is delivered through the inverter in reverse, via the bi-directional converter to the batteries, or via the buck converter to the auxiliary loads. Grid-parallel represents the mode in which the system 10 will normally operate when it is fully up and running, and when the ac mains are present and operating within normal limits. Fuel cell 32 provides power to the inverter 24 and to the auxiliary loads 34 as needed, and re-charges the battery 30 as necessary. Control of fuel cell 32 current, $I_{FC}$, and potentially also control of $V_{BUS}$, is performed by the inverter power control functions. Thus, dc system control of $I_{FC}$ and $V_{BUS}$ are disabled, as indicated in Table 1. The battery charging setpoints ($I_{BAT}$ and $V_{BAT}$) are still set to the command levels established by the supervisory controller 40, providing for battery charging requirements independently of the inverter operation.

In any of the modes that allow battery charging (Idle, Stand-alone or Grid-parallel), it is further possible to disable the battery charging function under control of the supervisory controller 40. In such cases, the $I_{BAT}$ and $V_{BAT}$ regulation modes are disabled, and system 10 regulates only $I_{FC}$ or $V_{BUS}$ as established by the control arbitration rules associated with those variables, i.e., according to defined control priorities. In the Idle and Stand-alone modes, such operation results in the bi-directional converter 20 remaining inactive unless the dc load requirements of the auxiliary loads 34 and/or inverter 24 exceed the short-term supply capability of the fuel cell 32. In that case, system 10 regulates either $I_{FC}$ or $V_{BUS}$ to provide the excess load requirement from the battery 30. In the Grid-parallel mode, the $I_{FC}$ and $V_{BUS}$ regulation modes are already disabled, so disabling battery charging effectively disables the bi-directional converter 20.

With regard to battery charging, system 10 provides for battery charging operation in either a constant-current charging mode or a constant-voltage charging mode. Supervisory controller 40 can provide the regulation setpoints to system 10 and can update them as needed or desired, or system 10 can be configured to store one or more setpoint values corresponding to default regulation setpoints, for example. When charging is enabled (CHARGE is asserted), the control system will attempt to regulate $I_{BAT}$ relative to the $I_{BAT}$* setpoint as the default regulation variable, unless the battery voltage $V_{BAT}$ exceeds the $V_{BAT}$* setpoint. In that case, system 10 automatically switches regulation control from $I_{BAT}$ over to $V_{BAT}$.

Likewise, when regulating battery voltage, the control variable $V_{BAT}$ is regulated relative to the $V_{BAT}$* setpoint, unless the battery current $I_{BAT}$ exceeds the $I_{BAT}$* setpoint, in which case system 10 automatically switches regulation control from $V_{BAT}$ over to $I_{BAT}$. In other words, system 10 regulates one or the other of the battery variables ($V_{BAT}$ or $I_{BAT}$) but continues monitoring the other variable to ensure that battery-charging current limits are not exceeded, thereby providing an inherent battery charging voltage limiting and current limiting function.

Figure 2:
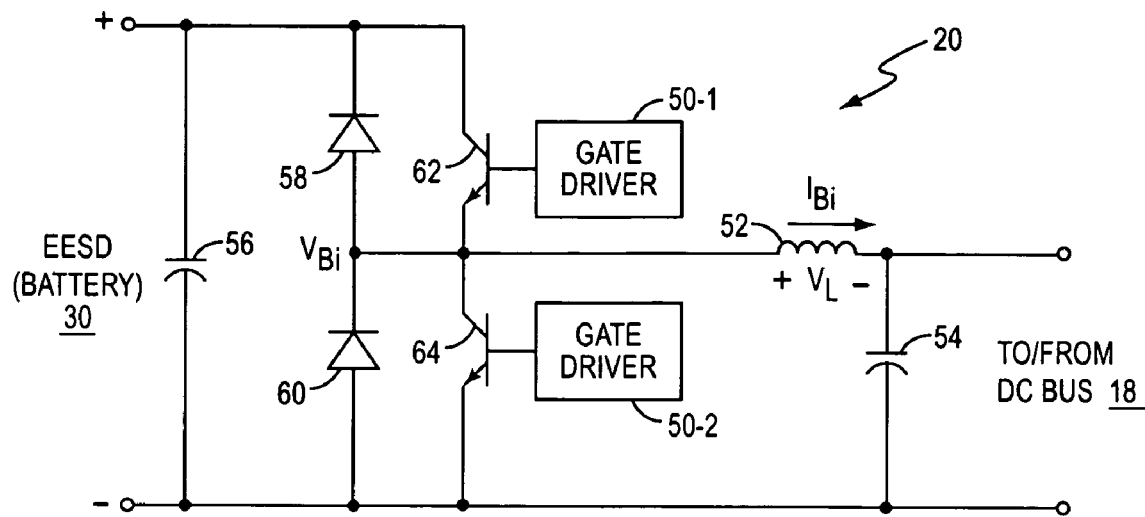
FIG. 2 is a diagram of an exemplary bi-direction converter or battery charger that can be implemented in the system of FIG. 1.

Bi-directional converter 20, in part, enables such control. FIG. 2 illustrates an exemplary embodiment of bi-directional converter 20. As illustrated, bi-directional converter 20 comprises a switched reactive circuit that couples battery 30 to the dc bus 18 and includes gate drivers 50-1 and 50-2, inductor 52, capacitors 54 and 56, diodes 58 and 60, and transistors 62 and 64. Note that transistors 62 and 64 are depicted as Bi-polar Junction Transistors (BJTs), but those skilled in the art will appreciate that other transistor types can be used (MOSFETs, IGBTs, etc.).

Thus configured, the converter 20 comprises a single power pole and a capacitive filter connected to corresponding battery connection terminals of system 10, with the center point of the power pole connected to inductor 52 acting as filter inductor. The other end of the inductor 52 is connected to dc bus 18. The transistors 62 and 64 comprising the power pole are switched in tandem (i.e. when one transistor is turned on, the other is turned off, and vice versa). The power pole is switched at a fixed carrier frequency, with duty cycle being varied by controller 12 to achieve control of the bi-directional converter 20. If the duty cycle, D, is defined with respect to the on-time ($t_{on}$) of the upper transistor (transistor 62), then the voltage, $V_{Bi}$, on the center-tap of the power pole (assuming continuous conduction of inductor current) is determined by:

$$V_{Bi} = D \cdot V_{bat} \quad \text{where:} \quad D = \frac{t_{on}}{t_{on} + t_{off}}. \tag{1}$$

Controller 12 can adjust this voltage as necessary by varying the duty cycle of bi-directional converter 20 to establish the desired level of current through the filter inductor 52, to either charge or discharge the battery 30. It should be noted that during charging of battery 30, the lower transistor 64 and upper diode 58 are active, effectively forming a standard Boost converter that delivers power to the battery 30. During discharging, the upper transistor 62 and lower diode 60 are active, effectively forming a standard Buck converter that delivers power to the dc bus. Thus, by varying the duty cycle of its operation, controller 12 can control an amount of current delivered to the dc bus 18 via the bi-directional converter 20. Note that such operation further permits control of the dc bus voltage, $V_{BUS}$. The filter inductor 52 assists in the delivery of power to (or removal of power from) the dc bus 18, and further serves to smooth the current $I_{Bi}$ that flows to or from the dc bus 18 through the bi-directional converter 20.

Simply put, the control logic of controller 12 can be configured to vary the voltage $V_{Bi}$ appearing on the center-tap of the power pole by varying the duty cycle of the switching signal applied to bi-directional converter 20, which in turn determines the rate of change of $I_{Bi}$ into (or out of) dc bus 18. This control over $I_{Bi}$ gives the dc control 14 a single control handle with which it can effect regulation of any of the variables of interest. For example, if fuel cell current $I_{FC}$ is being regulated and it is desired to raise $I_{FC}$, dc control 14 can lower $I_{Bi}$ flowing into dc bus 18 by temporarily dropping the voltage $V_{Bi}$. These operations are explained in more detail below but, in essence, bi-directional converter 20 acts as a "power valve" controlling the power flow into and out of the dc bus 18. Those skilled in the art will appreciate that other types of circuits can be used to fulfill the same functional role and that the present invention is not limited to the particular converter circuit illustrated.

Figure 3:
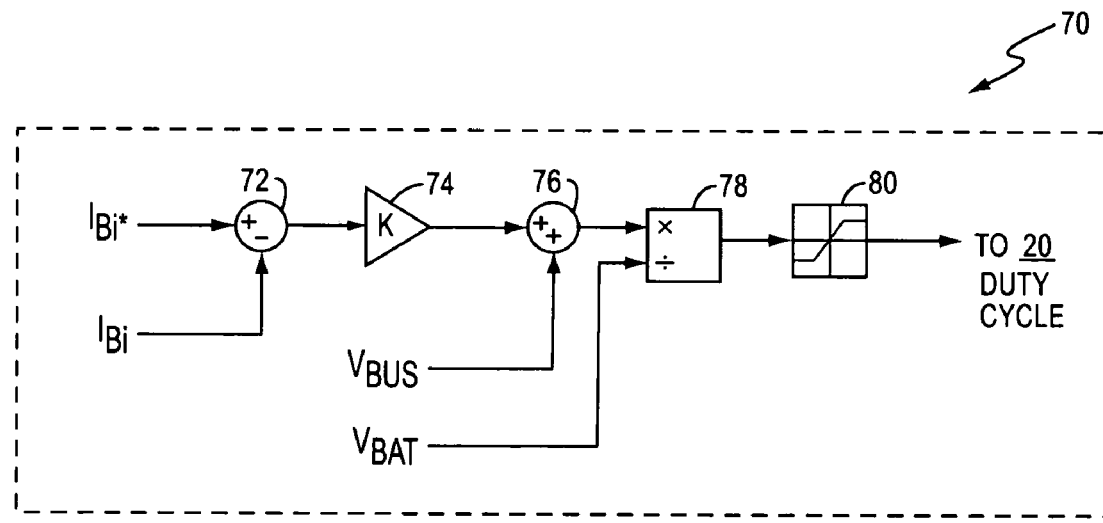
FIG. 3 is a diagram of an exemplary bi-directional converter controller that can be implemented in the system of FIG. 1.

FIG. 3 illustrates an exemplary converter control circuit 70 for controlling the bi-directional converter 20, which can be implemented in controller 12. Converter control circuit 70 functionally comprises a first summer 72, a gain stage 74, a second summer 76, a multiply/divide circuit 78, and a limiter 80. Converter control circuit 70 receives as input a measurement of the bi-directional converter current, $I_{Bi}$, and its corresponding setpoint value, $I_{Bi}$*, and additionally receives the dc bus voltage, $V_{BUS}$, and the battery voltage, $V_{BAT}$.

In operation, converter control circuit 70 determines the duty cycle to be applied to the gate drivers 50 of the bi-directional converter 20 based upon a desired value of bi-directional converter current as indicated by the setpoint value $I_{Bi}$*. Circuit 70 embodies a modified deadbeat control method that attempts to control the voltage applied across filter inductor 52 in order to achieve a commanded current level in the shortest possible time. The control operates in discrete-time fashion, and it calculates at every time step the voltage necessary to apply across the inductor 52 to achieve the desired current at the next time step.

Ideally, the inductor current control operates according to the following control law, which applies an inductor voltage $V_L$ sufficient to change from the existing inductor current $I_{Bi}$ to the desired inductor current $I_{Bi}$* in one time step Δt:

$$V_L = L\frac{\Delta I}{\Delta t} = L\frac{(I_{Bi}^* - I_{Bi})}{\Delta t}. \quad (2)$$

The bi-directional converter voltage required to apply the desired inductor voltage is then:

$$V_{Bi} = V_{BUS} + V_L = V_{BUS} + L\frac{(I_{Bi}^* - I_{Bi})}{\Delta t} = V_{BUS} + K(I_{Bi}^* - I_{Bi}), \quad (3)$$

where $$K = \frac{L}{\Delta t}.$$

The bi-directional converter duty cycle D that will apply the desired inductor voltage is therefore:

$$D = \frac{V_{Bi}}{V_{BAT}} = \frac{V_{BUS} + K(I_{Bi}^* - I_{Bi})}{V_{BAT}}. \quad (4)$$

Eq. (28) represents the control law implemented in the control circuit 70 of FIG. 3. Further, the duty cycle D can be limited so that values less than 0 or greater than 1 cannot be commanded, even if the control law calls for such values. In practice, the actual value of the control gain K should be chosen to be less than the ideal value, in order to ensure stability of the control loop. The value K=0.33·(L/Δt) has been found to provide an adequate balance between stability and speed of response. The bi-directional converter 20 can thus be operated as a current regulator to provide a fast, stable inner loop that provides the necessary building block for the outer control loops used by the multivariable controller 12 to regulate the multiple control variables of interest in system 10.

Figure 4:
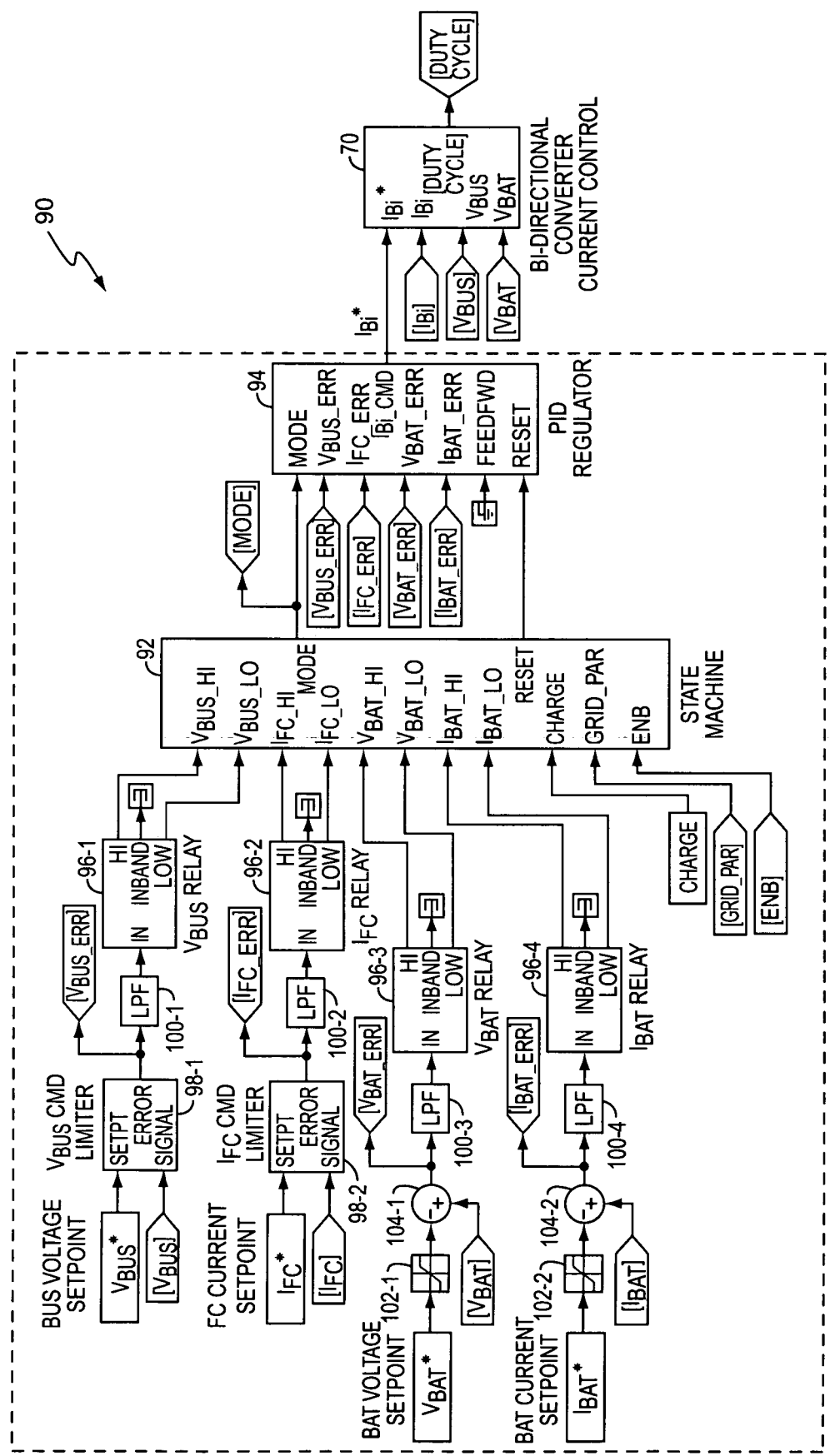
FIG. 4 is a diagram of an exemplary multivariable control circuit that can be implemented in the system of FIG. 1.

An exemplary embodiment of a portion of the control logic embodied in multivariable controller 12 appears in FIG. 4. More specifically, FIG. 4 illustrates a mode controller 90 that provides regulation mode control based on monitoring the control variables of interest and receiving corresponding desired setpoints for those variables. As depicted, mode controller 90 comprises a mode arbitration state machine 92, a Proportional-Integral-Derivative (PID) regulator 94, and various supporting logic elements, including tri-state "relays" 96-1 through 96-4, setpoint limiters 98-1 and 98-2, Low Pass Filters (LPFs) 100-1 through 100-4, limiters 102-1 and 102-2, and summers 104-1 and 104-2.

In the illustrated embodiment, each of the four control variable setpoints is first bounded, or value limited, to ensure that out-of-bounds setpoint values are not commanded. Thus, the command values $V_{BUS}^*$, $I_{FC}^*$, $V_{BAT}^*$, and $I_{BAT}^*$ each are input to a respective one of the setpoint limiters 98-1 or 98-2, or to a respective one of limiters 102-1 or 102-2. By rate limiting the setpoint inputs, controller 12 prevents a too-rapid command change from causing overshoot of the associated control variables. Besides causing temporary excursions beyond the allowable control limits, overshoot has the potential to create a "limit-cycling" type of operation, where control cyclically transitions between two or more control modes, instead of choosing one control mode and remaining there, as desired. Such rate limiting particularly is beneficial for the $V_{BUS}$ setpoint, $V_{BUS}^*$, where rate limiting prevents large dc bus charging currents that otherwise would arise from trying to move the dc bus voltage, $V_{BUS}$, too quickly.

After setpoint magnitude and rate limiting, an error signal is generated for each control variable of interest by subtracting the corresponding setpoint from the associated control variable, or vice versa. In an exemplary embodiment, the polarity of each error signal is chosen so that a positive value indicates an excursion into a disallowed operating state for that variable. For example, a value of $V_{BUS}$ below the minimum setpoint value must be corrected, and this situation generates a positive error signal. Similarly, a value of $I_{FC}$ above the corresponding setpoint level ($I_{FC}^*$) must be corrected, and that situation thus generates a positive error signal for the $I_{FC}$ control variable.

These various control variable error signals are subsequently used in two ways. First, they are used to determine whether each of the control variables is substantially at its associated setpoint, is within its allowable operating range, or is in its disallowed operating range. Second, they are used selectively as inputs to the PID regulator 94, which acts to increase the bi-directional converter current, $I_{Bi}$, in response to a positive error for the control variable being regulated, and to decrease the bi-directional converter current in response to a negative error for that control variable.

Figure 5:
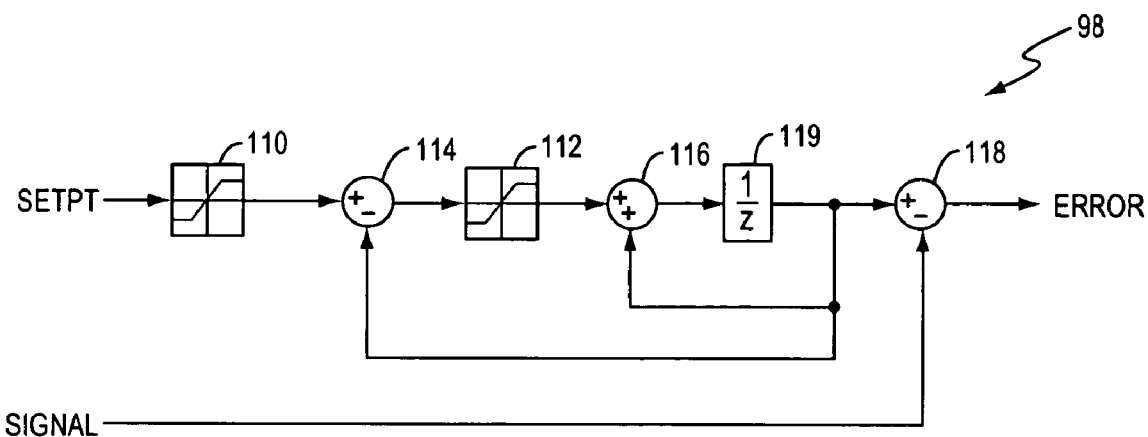
FIG. 5 is a diagram of an exemplary setpoint magnitude/rate limiter that can be implemented in the system of FIG. 1.

FIG. 5 illustrates an exemplary combined magnitude/rate limiter and error calculation structure that can be embodied in setpoint limiters 98 and which implements the functions described immediately above. As illustrated, the exemplary structure comprises limiters 110 and 112, summers 114, 116, and 118, and a delay element 119.

Referring back to FIG. 4, the error signals thus generated for the control variables are then low-pass filtered. Low-pass filtering of the control variables substantially removes any ripple component at twice mains frequency that might appear in the control variable measurement signals input to the control. In an exemplary embodiment, the filters 100-1 through 100-4 can be implemented as sliding average filters (equal coefficient FIR) with a length equal to half the mains period, to optimize the twice mains frequency rejection. Low-pass filtering also slows the response of the system's mode arbitration logic to changes in the control states, helping to prevent the occurrence of the aforementioned limit cycles.

Figure 6:
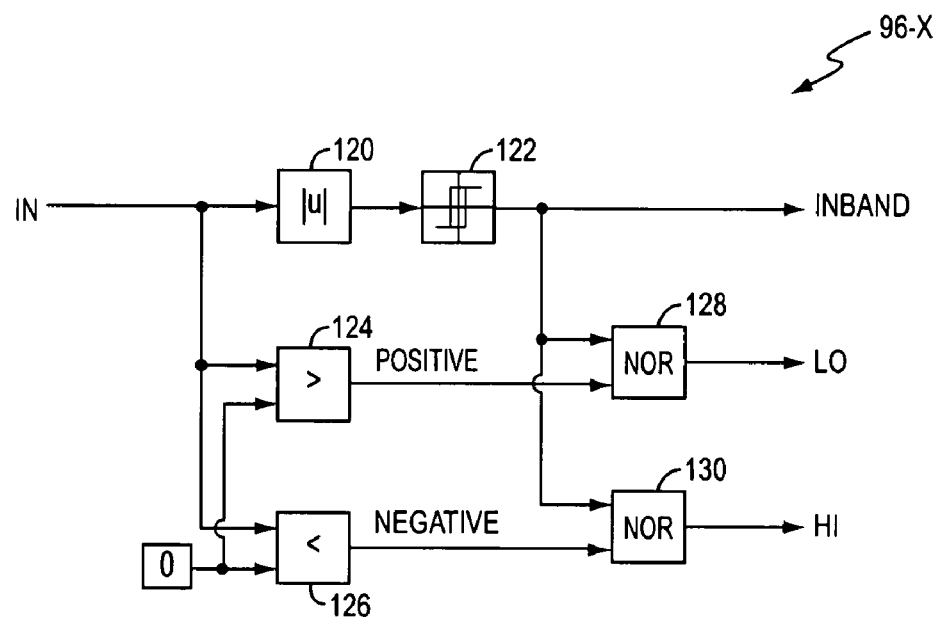
FIG. 6 is a diagram of an exemplary tri-state control relay that can be implemented in the system of FIG. 1.

Each of the filtered error signals is passed to a corresponding one of the tri-state control relays 96. FIG. 6 depicts an exemplary embodiment for each of the relays 96. Functionally, each relay 96-x (where "x" denotes a given one of the relays 96) comprises an absolute value circuit 120, a hysteresis-based comparator 122, sign detectors 124 and 126, and output logic (NOR) gates 128 and 130. With this configuration, each relay 96-x examines its input error signal to determine whether the error is within a pre-determined tolerance band around zero error, and if so, activates the INBAND signal. If the error signal does not fall within the tolerance band, then either the LO or the HI output signal is activated, depending on the sign of the error signal. As indicated above in the explanation of error signal sign sense, the LO signal indicates that the error is within the allowable range, while the HI signal indicates that the error is within the disallowed range, i.e., that the corresponding control variable has exceeded an allowable range.

To minimize the possibility of relay "chatter," the INBAND comparison is performed with hysteresis, wherein the tolerance band for entering the INBAND region is narrower than the tolerance band for leaving the INBAND region. The tolerance band settings for entering and leaving the INBAND region can be selected individually for each relay 96-x to complement the characteristics of the particular control variable's error signal being handled by that relay 96-x.

The INBAND and LO/HI outputs from the relays 96 feed into state machine 92. State machine 92 also receives an indication of the desired battery charging mode (Charging Enabled or Charging Disabled) from the supervisory controller 40, and an indication of whether the inverter 24 is operating in Grid-parallel or Stand-alone modes. In turn, the state machine 92 generates two output values: a MODE signal and a RESET signal flag. The MODE signal controls the regulation mode of the system 10, i.e., controls which one of the multiple control variables of interest is selected for regulation control against its corresponding setpoint. The RESET signal flag disables the bi-directional converter 20 when no regulation is desired.

Figure 7A:
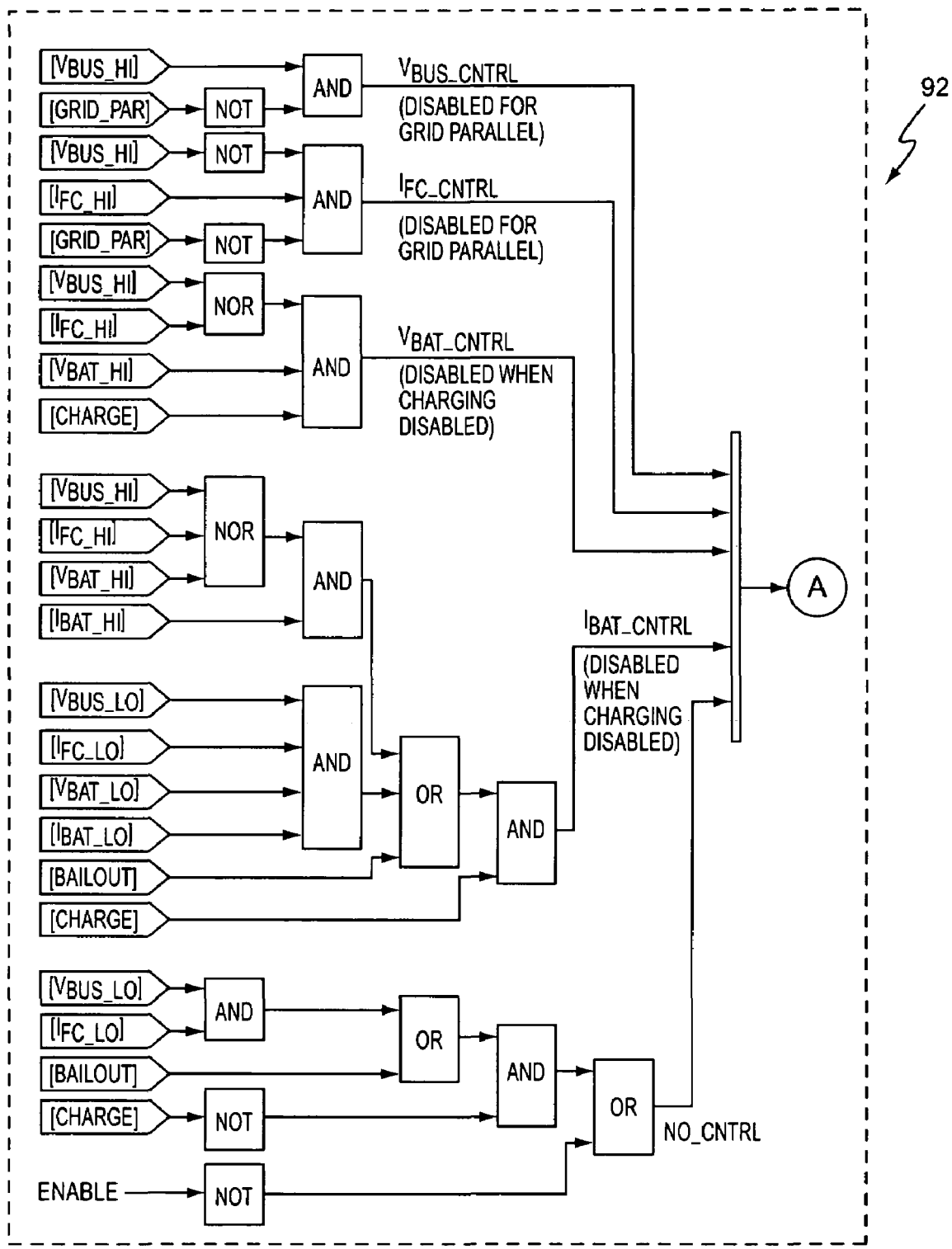
FIGS. 7A and 7B are diagrams of an exemplary mode controller that can be implemented in the system of FIG. 1.
Figure 7B:
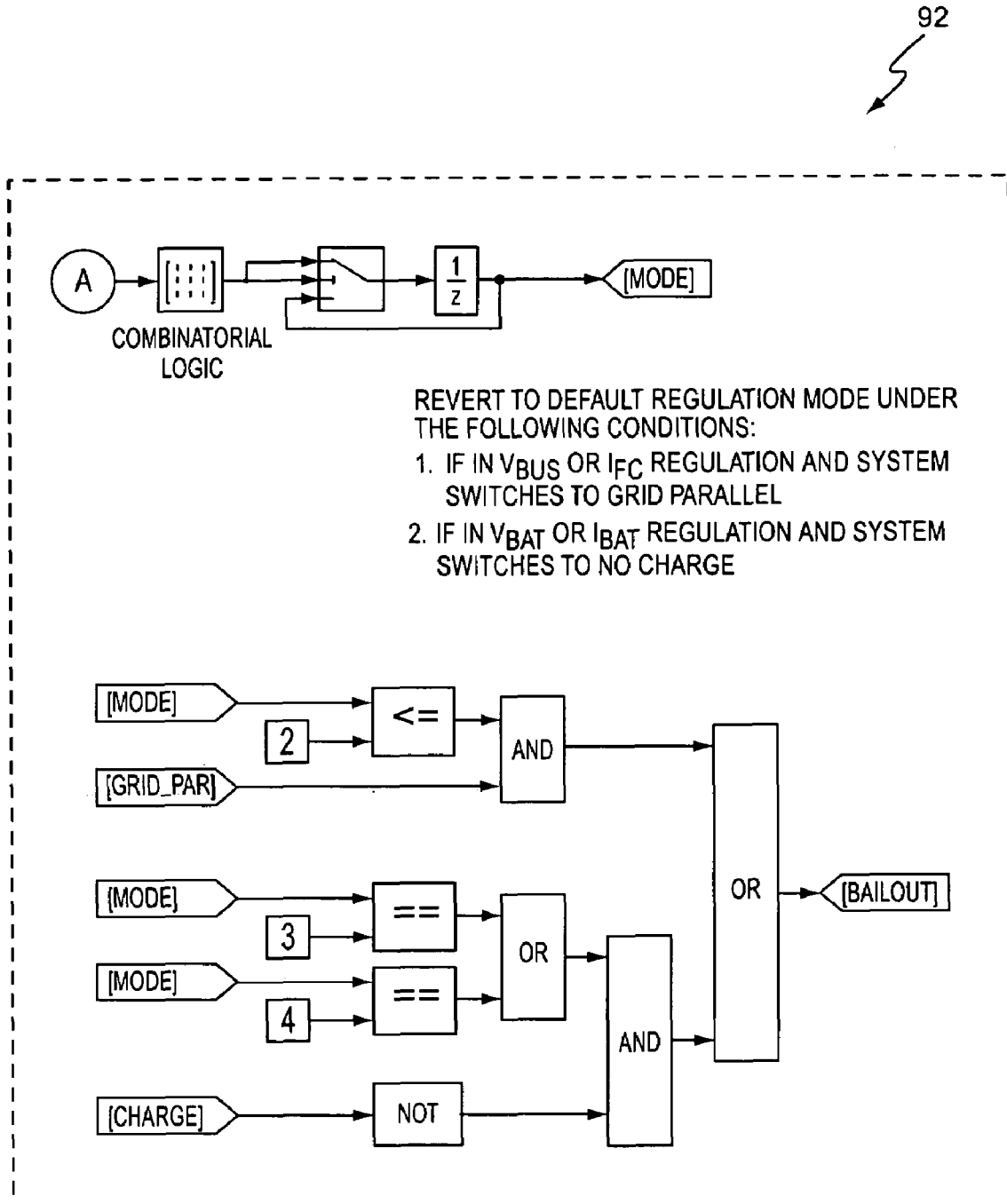

FIGS. 7A and 7B depict exemplary logic for the implementation of state machine 92. In accordance with such logic, when state machine 92 is started it begins operation with the MODE signal set to a value indicative of the "No Control" mode. At each subsequent sampling instant, the mode selection logic within state machine 92 determines whether conditions warrant changing to a different control mode and, if so, it updates the value of the MODE signal to indicate the changed control mode. With this arrangement, then, the PID regulator 94 can be made to regulate any one of the plurality of control variables of interest in system 10. Each control variable, e.g., $I_{FC}$, $I_{BAT}$, $V_{BAT}$, $V_{BUS}$, has its own control loop (limiters/filters, error signal generation circuits) that can be selectively closed through the PID regulator 94 based on the MODE signal from state machine 92. In this manner, the same PID regulator 94 is common to all control loops but it can be reconfigured dynamically (gains, etc.) based on the particular control variable selected for regulation.

With respect to selecting a particular one of the control variables for regulation control, or to changing from regulating a currently selected one of the control variables to regulating a newly selected one of the remaining control variables, the logic described below represents an exemplary implementation of state machine 92. First, if system 10 is in the Charging Enabled mode, system 10 operates according to the following logic:
  any error signal "HI" gets regulated with the following precedence: $V_{BUS}$, then $I_{FC}$, then $V_{BAT}$, then $I_{BAT}$;
  if no error signal is "HI", and not all error signals are "LO", hold the last mode; and
  if all four error signals are "LO", default to $I_{BAT}$ regulation.

If system 10 is in the Charging Disabled mode, it operates according to the following logic:
  ignore the $V_{BAT}$ and $I_{BAT}$ error signals;
  any error signal "HI" gets regulated with the following precedence: $V_{BUS}$, then $I_{FC}$;
  if no error signal (except $V_{BAT}$ or $I_{BAT}$) is "HI", and not all error signals (except $V_{BAT}$ or $I_{BAT}$) are "LO", then hold the last mode; and
  if both error signals (excluding $V_{BAT}$ and $I_{BAT}$) are "LO", default to no regulation (turn off the bi-directional converter 20).

In addition to the mode selection rules above, if system 10 enters the Grid-parallel mode, it operates according to the following logic:
  if the system is already in $V_{BUS}$ regulation or $I_{FC}$ regulation, revert to the default regulation mode (either $I_{BAT}$ regulation or no regulation) according the battery charging mode as indicated above; and
  do not allow the system to enter the $V_{BUS}$ regulation or $I_{FC}$ regulation modes, even if indicated by the rules above.

FIG. 7B illustrates exemplary logic configured to carry out the above rules. The illustrated logic can be configured to generate a MODE signal responsive to input from the circuitry of FIG. 7A, wherein the MODE signal has different values representing different modes (e.g., "1"=$V_{BUS}$ regulation mode, "2"=$I_{FC}$ regulation mode, "3"=$V_{BAT}$ regulation mode, "4"=$I_{BAT}$ regulation mode, "4"=$I_{BAT}$ regulation mode, and "5"=No_CNTRL mode). Using the MODE signal, the logic of FIG. 7B implements the above regulation rules by evaluating whether MODE currently is "2" or less (i.e., MODE equals $V_{BUS}$ or $I_{FC}$), and whether the GRID_PAR signal is asserted, indicating that mains inverter 24 is operating in Grid-parallel mode. If both conditions are met, a "BAILOUT" signal is generated, which feeds into the logic circuits of FIG. 7A to revert regulation control to the default variable. In an exemplary embodiment, the default variable is $I_{BAT}$ for charging mode and No_CNTRL for non-charging mode.

Likewise, if system 10 enters the Charging Disabled mode, it operates according to the following logic:
  if the system is already in $V_{BAT}$ regulation or $I_{BAT}$ regulation, revert to the default (no regulation) mode; and
  do not allow the system to enter the $V_{BAT}$ regulation or $I_{BAT}$ regulation modes, even if indicated by the rules above.

FIG. 7B illustrates exemplary logic configured to carry out the above rules. Using the MODE signal, the logic of FIG. 7B implements the above regulation rules by evaluating whether MODE currently equals "3" or "4" (i.e., MODE equals $V_{BAT}$ or $I_{BAT}$), and whether the CHARGE signal is asserted. If the current MODE is VBAT or IBAT regulation and CHARGE is not asserted, the BAILOUT signal is asserted, reverting regulation control to the default variable, which may be No_CNTRL. With No_CNTRL regulation, the dc control 14 avoids running the bi-directional converter 20, so that the battery 30 is not charged. Note that multi-variable control 12 may set $V_{BUS}$* to a minimum command value and set $I_{FC}$* to an applicable upper limit, and then, if not in Grid-parallel mode, re-activate the bi-directional converter 20 if either limit is reached.

The regulation precedence order embodied in the above logic rules as enforced by state machine 92 represent an exemplary and considered approach to the myriad challenges in managing system 10 according to a number of physical constraints. For example, operating the fuel cell 32 below its minimum allowable voltage can lead to physical damage, and therefore $V_{BUS}$ is always the control variable that takes the highest precedence in terms of regulation control. Also, because of the inverse relationship between fuel cell voltage and current, limiting the decrease in fuel cell voltage also limits the increase in fuel cell current. Therefore, if the fuel cell voltage goes too low at the same time that the fuel cell current goes too high, regulating $V_{BUS}$ will tend to bring both variables closer to their respective setpoints. If, after bringing $V_{BUS}$ into regulation, $I_{FC}$ remains too high, controller 12 will switch to $I_{FC}$ regulation, which will move $V_{BUS}$ further into its allowable operating range.

There are similar relationships between each of the control variables that are reflected in the chosen regulation precedence order.

Similarly, the default regulation variables are chosen to provide the greatest likelihood of a benign system response when all control variables are within their allowable ranges. For example, if the system is in the Charging Enabled mode and all control variables are in the LO range, the control defaults to $I_{BAT}$ regulation. This will raise the level of $-I_{BAT}$, which will tend to raise the level of $-I_{Bi}$ (i.e. more current will be delivered to the battery 30, and more current will be drawn from the dc bus 18 via bi-directional converter 20). This will in turn tend to raise the level of $I_{FC}$ and lower the level of $V_{BUS}$. All of these actions will move the ensemble of control variables closer to their respective setpoints. This trend continues until (1) $I_{BAT}$ reaches its setpoint, or (2) one of the other variables moves out of its allowable operating range. In the latter case, controller 12 will switch regulation control over to the control variable that is outside its allowed range.

The special mode selection rules related to the Grid-parallel mode are required to prevent the dc control 14 from conflicting with the ac control 16. In Stand-alone operation, the inverter 24 acts only as a voltage regulator, and the power flow through inverter 24 is determined mainly by the ac load requirements. In that case, all dc side regulation must be provided by the dc control 14. In Grid-parallel operation, the inverter 24 controls power flow from the dc bus 18 to the ac mains. This requires the existence within the ac control 16 of additional control circuits similar to the multi-variable control circuits depicted in FIG. 4.

Figure 8:
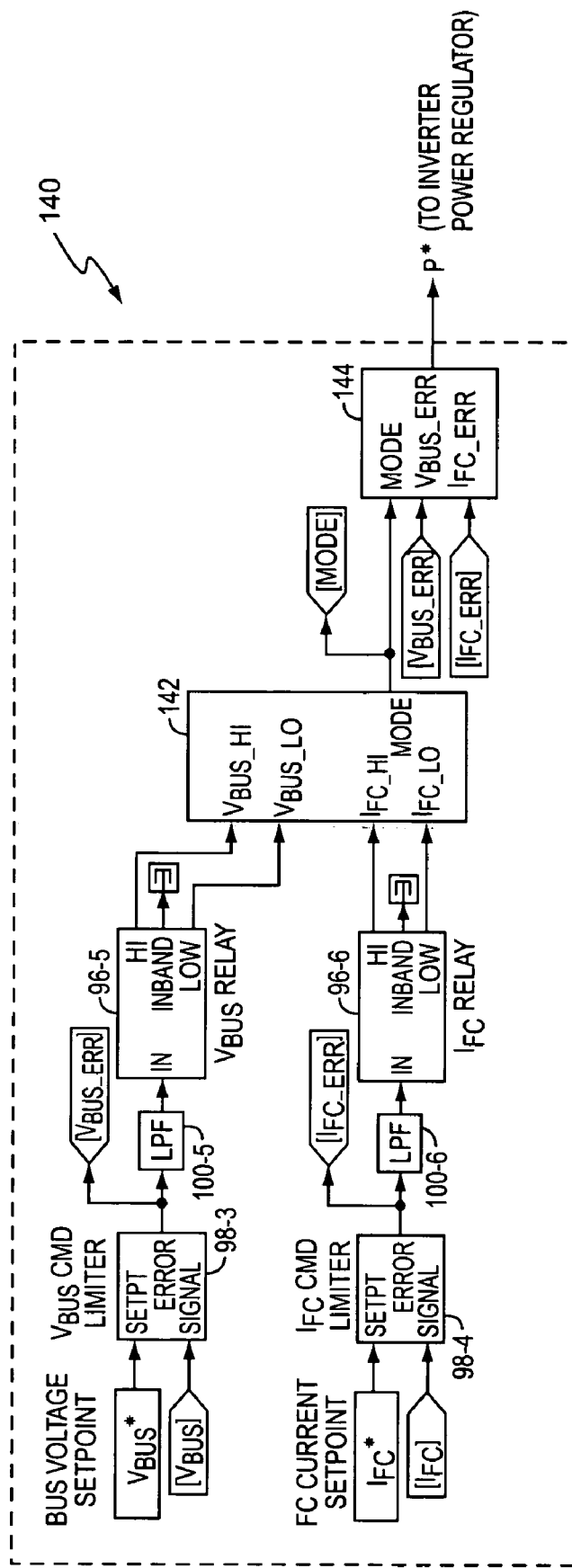
FIG. 8 is a diagram of exemplary mode control logic associated with operation in Grid-parallel mode, wherein exemplary mains inverter regulation is based on output power rather than voltage.

FIG. 8 illustrates exemplary circuits 140 that can be implemented as part of ac control 16 to provide the desired control functionality for Grid-parallel. In this case, the ac control 16 is responsible for regulating current from fuel cell 32 and/or dc bus voltage, and the dc control 14 is independently responsible for regulating battery charging ($V_{BAT}$ or $I_{BAT}$). More particularly, those skilled in the art will appreciate that inverter 24—unless it includes rectification circuits that would prevent reverse power flow—can use input dc power to output ac power to the mains or, in the reverse direction, use ac mains power to output dc power to the dc bus 18. That is, inverter 24 can put dc current derived from the ac mains into dc bus 18 and, because of that, the ac control 16 can use the mains inverter as a "common" control handle for regulating $V_{BUS}$ and $I_{FC}$, in much the same way that bi-directional converter 20 provides a common control handle to the dc control 14. Thus, in exemplary Grid-parallel operation, the dc control 14 provides regulation control for $V_{BAT}$ and $I_{BAT}$ (depending on the CHARGE signal state as provided by supervisory controller 40), and the ac control 16 provides regulation control for $V_{BUS}$ and $I_{FC}$. That regulation control capability enables system 10 to use dc power from the ac mains for powering the auxiliary loads 34, charging the battery 30, etc.

Referring back to FIG. 4, state machine 92 does not respond to the $V_{BUS}$ and $I_{FC}$ variables when the GRID_PAR signal is asserted, and therefore permits the simultaneous regulation operation of state machine 142. (Note that additional processing control logic in controller 12 can be configured to generate the GRID_PAR signal based on, for example, verifying that the ac grid is operating within normal parameters and that mains inverter 24 is properly synchronized to and connected with the grid.) Therefore, in Grid-parallel operation it is possible to simultaneously regulate two of the system variables at the same time. From FIG. 8, one sees that circuits 140 include a mode arbitration state machine 142, which may be configured similarly to state machine 92, a PID regulator 144, and various supporting logic elements, including tri-state relays 96-5 and 96-6, setpoint limiters 98-3 and 98-4, and LPFs 100-5 and 100-6.

With the above rules in mind, and with the operation of state machine 92 thus explained, Table 3 below illustrates exemplary combinatorial logic associated with regulation mode determination, i.e., with regulation control variable selection. The combinatorial logic block shown in FIG. 7B operates in such a way that if any one of the control state change signals at its input becomes active, the regulation mode switches to the state indicated by that signal. Those skilled in the art will appreciate that such logic can be implemented according to various arrangements as needed or desired. However, Table 3 below describes the exemplary operation of such logic, wherein the various control modes have been enumerated by integer values 1–5.

TABLE 3

| $V_{BUS\_CNTRL}$ | $I_{FC\_CNTRL}$ | $V_{BAT\_CNTRL}$ | $I_{BAT\_CNTRL}$ | No_CNTRL | Next_Mode | |
|---|---|---|---|---|---|---|
| 0 | 0 | 0 | 0 | 0 | 0 | Hold Last State |
| 0 | 0 | 0 | 0 | 1 | 5 | "No Control" Mode |
| 0 | 0 | 0 | 1 | 0 | 4 | $I_{BAT}$ Control Mode |
| 0 | 0 | 1 | 0 | 0 | 3 | $V_{BAT}$ Control Mode |
| 0 | 1 | 0 | 0 | 0 | 2 | $I_{FC}$ Control Mode |
| 1 | 0 | 0 | 0 | 0 | 1 | $V_{BUS}$ Control Mode |
| More than one state change signal = 1 | | | | | 0 | (Illegal) |

The Next_Mode value determines which mode will be selected at the next time step, based on the signal values at the present time step. If no control state change signal is active, then the value of Next_Mode is zero, and the control remains in the previous regulation mode ("Hold Last State"). More than one control state change signal being active at a given time is precluded by the mutually exclusive nature of the mode select logic. In any case, if more than one control state change signal were to become active at the same time, the control would respond by remaining in the last valid state.

It should be noted that each of the control setpoints represents a one-sided bound on the associated control variable. For some of the control variables, the opposite bound is inherent in the physical construction of the system. In other cases, additional system checks must be performed in order to artificially provide the opposite bound and to prevent the system from exceeding its operating limits. This situation is illustrated in Table 4 below.

TABLE 4

| Control Variable | Lower Limit | Upper Limit |
| --- | --- | --- |
| $V_{BUS}$ | $V_{BUS}*$ | Trip on Bus Overvoltage |
| $I_{FC}$ | 0 (limited by blocking diode) | $I_{FC}*$ |
| $V_{BAT}$ | 0 (limited by Bi-Converter) | $V_{BAT}*$ |
| $I_{BAT}$ | $I_{BAT}*$ | Trip on Battery Overcurrent |

For example, the fuel cell current setpoint ($I_{FC}*$) represents an upper limit, while the corresponding lower limit ($I_{FC}=0$) is provided inherently by the blocking diode in series with the fuel cell 32, i.e., the reverse blocking/filter circuit 22 prevents reverse current flow into fuel cell 32 if the dc bus voltage is elevated above the fuel cell's voltage. As another example, the dc bus voltage setpoint ($V_{BUS}*$) represents a lower limit; there is no physical upper bound on the system, and therefore a Bus Overvoltage trip function is provided to protect the system from accidental damage. In practice, this upper limit would only be encountered in the extreme case where the supervisory controller 40 provided an inconsistent set of control setpoints. Both of the trip conditions shown in the table (Bus Overvoltage and Battery Overcurrent) result in the system 10 automatically reverting to the Offline mode.

Figure 9:
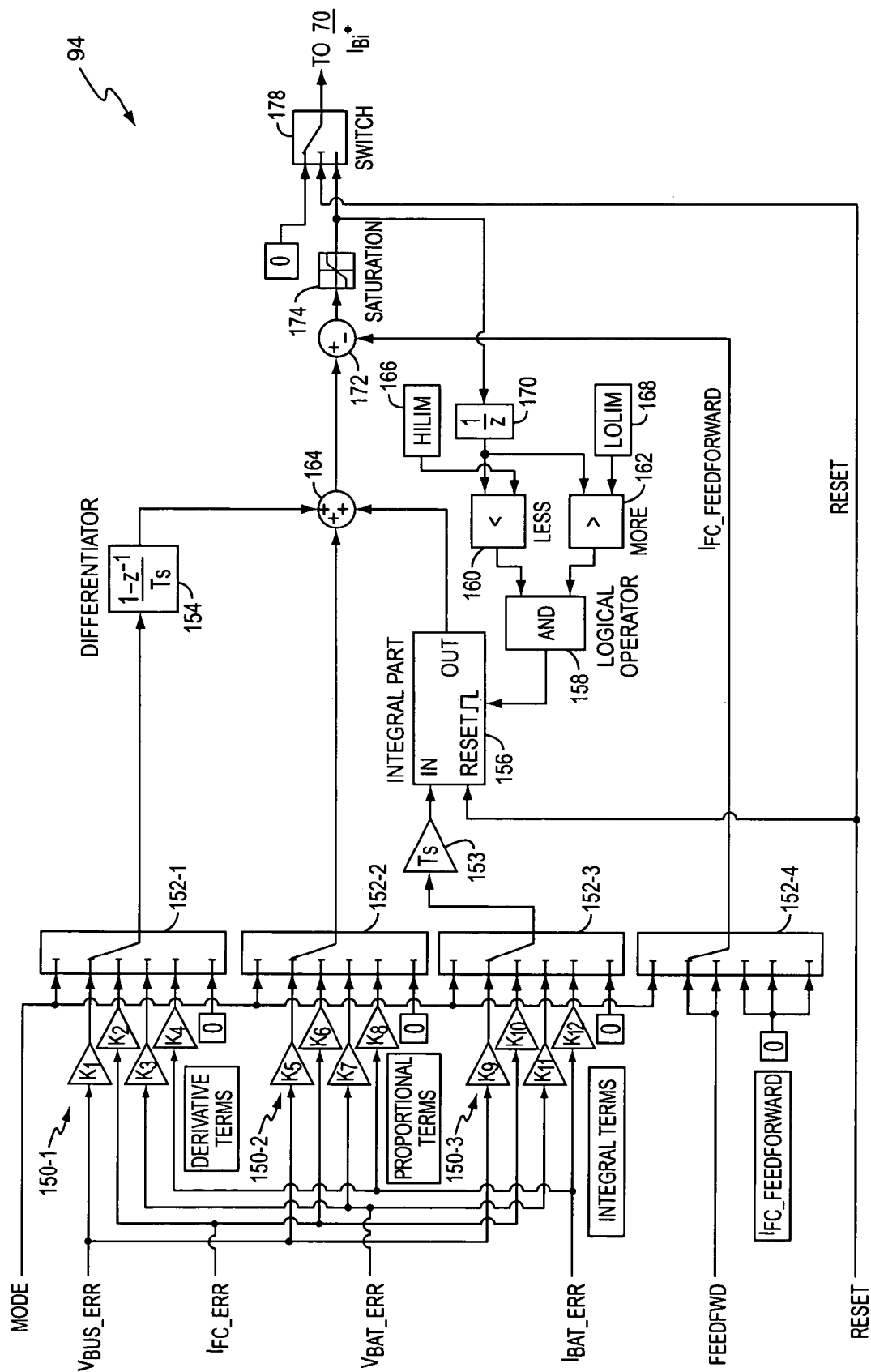
FIG. 9 is a diagram of an exemplary PID regulator that can be implemented in the system of FIG. 1.

Again returning to FIG. 4, one sees that the MODE and RESET signals generated by the state machine 92 and the previously calculated error signals are passed to the PID regulator 94. As noted, the PID regulator 94 controls the value of the bi-directional converter current, $I_{Bi}$, to regulate the selected control variable relative to its corresponding setpoint. An exemplary embodiment of the PID regulator 94 is illustrated in FIG. 9.

The illustrated PID regulator 94 comprises a plurality of blocks of gain circuits 150-1 through 150-3. These gain circuits provide a proportional, derivative, and integral gain term appropriate for each one of the control variables of interest. Thus, switching circuits 152-1 through 152-3 provide an apparatus whereby the appropriate gain terms for the currently selected control variable, i.e., the control variable being regulated via PID regulator 94, are selectively switched in according to the value of the MODE signal provided by state machine 92. PID regulator 94 comprises a variety of additional supporting circuitry, including gain circuit 153, differentiator 154, re-settable integrator 156, logical gates and comparators 158, 160, and 162, summer 164, limit constants 166 and 168, delay gate 170, summer 172, limiter 174, and switch 178. Note that switch 178 selectively provides the $I_{Bi}*$ to converter controller circuit 70 as a "zero" signal, or as the PID-computed regulation signal, depending upon the state of the RESET signal.

The PID regulator's output value is limited by limiter 174 to prevent the current control command for the bi-directional converter 20 from exceeding reasonable values. The PID regulator 94 also is provided with anti-windup protection, to prevent the integrator from continuing to integrate when the regulator output value saturates. Provision also is made for adding in an optional feedforward control signal (see switch 152-4, which optionally provides an $I_{FC}$ feedforward term to summer 172).

Because the PID regulator 94 is used on a selective basis to regulate different ones of the control variables, one or more of its operating parameters can be varied or otherwise updated to tailor its control operation for the particular characteristics of the control variable currently being regulated by system 10. In an exemplary embodiment, PID regulator 94 includes memory for storing one or more variable-specific parameters, such as proportional, integral, and derivative gain terms to be used in gain blocks 150. Alternatively, another element or circuit within system 10 can store such parameters (or receive them from supervisory controller 40), and provide the appropriate terms to PID regulator 94.

In an exemplary embodiment, the MODE signal from state machine 92 selects an appropriate set of gains (proportional, derivative, and integral) to be used by the regulator 94, according to the desired variable to be regulated. The MODE signal further determines which of the system control variables of interest (e.g., $V_{BUS}$, $I_{FC}$, $V_{BAT}$, or $I_{BAT}$) is regulated. In the case of the "No Control" mode (MODE=5), a zero value is fed to each of the regulator terms. If the RESET signal flag is asserted, the integral state is reset to zero, and the regulator 94 is forced to output a zero value for the $I_{Bi}*$ command provided to converter control circuit 70.

Operation of converter control circuit 70 was explained in conjunction with FIG. 3. However, it should be noted that one benefit of sharing the same PID regulator 94 among all control variables of interest is that the control signal $I_{Bi}*$ used to set the duty cycle of bi-directional converter 20 via converter control circuit 70 is continuous during mode switching, resulting in seamless transitions between modes.

A complex set of relationships governs the choice of control parameters in an exemplary embodiment of the present invention's control method. The adjustable control parameters, as well as some of the control characteristics which they influence, are summarized in Table 5 below.

TABLE 5

| Control Parameters | Control Characteristics |
| --- | --- |
| Setpoint magnitude limits | Speed of loop response |
| Setpoint ramp rate limits | Speed of ramp response |
| Lowpass filter delay (length) | Control accuracy/stiffness |
| Relay hysteresis band limits | Overshoot |
| PID gains | 120 Hz rejection |
| $I_{Bi}$ saturation limits | Loop stability |
| Deadbeat control gain ($I_{Bi}$ control) | Resistance to limit cycling |
| | Behavior around physical system discontinuities |
| | Load change rejection |
| | Ramp pullout (undesired mode switching during ramp change) |

Various trade-offs may be observed among the control characteristics when varying one or more of the control parameters. For instance, narrowing the hysteresis band limits used in the relays 96 to prevent chatter leads to better control accuracy, but increases the tendency toward limit cycling between different control modes. Faster ramp rates lead to faster system response, but can lead to ramp pullout and overshoot problems. Slowing down the lowpass filters 100 improves 120 Hz rejection and resistance to limit cycling, but increases the mode switching delays in response to a control variable exceeding its allowable limits. Many other performance trade-offs apply to adjusting control parameters.

Against this backdrop of give-and-take tradeoffs, the present invention provides an exemplary methodology for tuning the PID regulator 94 and deadbeat control law of converter control circuit 70. First, the deadbeat gain of the bi-directional converter's current control loop ($I_{Bi}$) is tuned to give the fastest possible response while maintaining adequate stability and low overshoot. As mentioned previously, the value K=0.33·(L/Δt) has been found to give good results in this regard. Next, PID gains in regulator 94 for the dc bus voltage and fuel cell current control loops are chosen. These gains are selected to yield the fastest possible response while minimizing overshoot. A further aim of the dc bus voltage feedback control loop is to maintain good control stiffness in the presence of load changes. Finally, PID gains for the battery voltage and battery current feedback control loops are chosen to yield moderate response times (compared to the other loops). It can be advantageous to slow these latter two loops somewhat, in order to prevent any tendency toward limit cycling.

In general, it is not necessary to utilize non-zero derivative gain for any of the control variables except for the fuel cell current, $I_{FC}$. PI control (as opposed to PID control) was found to provide adequate control for the other control variables of interest over a range of test conditions. For control of fuel cell current, the selection of PI versus PID control is highly dependent on the selection of input filter topology (see reverse blocking circuit 22 in FIG. 1). If blocking circuit 22 includes an LC input filter with a stiff input source, PID control of fuel cell current has been found to be necessary for stabilizing system 10. The use of PID control comes at a cost, namely a significant reduction in rejection of 120 Hz current components from fuel cell current and battery current. When using a purely capacitive input filter, PI control of fuel cell current provides adequate control stability. Since the fuel cell 32 itself significantly slows the system dynamics, it also is possible to use PI control even with an LC input filter, but in that case the PI control must be carefully tuned to match the dynamic characteristics of the particular fuel cell 32 being used with system 10.

While the above exemplary details describe exemplary embodiments of the present invention in the context of an alternative energy control system 10, it should be understood that the apparatus and methods presented herein provide exemplary multivariable control in a variety of system types. By way of non-limiting example, the present invention can be advantageously applied to the control of dc distribution systems including one or more dc power sources feeding fixed or variable dc loads; the control of power systems where a single power control must selectively regulate one or more control quantities; the control of other interdependent multi-variable systems with a single control handle, including non-electrical systems; the control of single-phase inverters interfacing alternative energy sources (including photovoltaic arrays, fuel cells, micro-turbines, etc) to the ac mains; and the control of battery backup systems for UPS systems or alternate energy systems.

Broadly, the present invention permits control of multiple system variables using only a single control handle. In the context of alternative energy system 10, it enables battery charging or regulation of fuel cell current or internal dc bus voltage, as needed in order to meet the varying needs of the system 10 under different conditions via the single control handle provided by the bi-directional converter 20. While system 10 generally regulates only one control variable at a time, it acts to prevent any of the control variables from entering an operating region that might be damaging to any components in or associated with system 10.

As part of the exemplary method, system 10 provides a control loop for each control variable of interest, and then selectively closes a selected one of those control loops through the PID regulator 94, which is commonly shared by the different control loops. Dynamic switching within PID 94 allows its control behavior to be tailored for regulation of each individual control variable based on the selection of switchable gain terms. Thus, with the mode arbitration logic of state machine 92 and the switchable gain terms of PID regulator 94, the multivariable controller 12 provides automatic variable selection and regulation control tuning wherein it automatically selects a particular one of the control variables for regulation (and tunes itself) as needed based on the mode and monitored conditions (LO/HI/IN-BAND) for each of the control variables of interest.

Thus, system 10 combines multiple control variable feedback control loops into a single multi-variable control using a common PID regulator. The control method monitors each variable's error signal and converts it into a tri-state or trinary logic signal (HI/LO/INBAND). Combinatorial logic and state machine techniques are used in novel fashion to determine the correct regulation control mode for system 10. Such control can be implemented in whole or in part within one or more Digital Signal Processors (DSPs), microprocessors, microcontrollers, or other digital processing circuits, such as ASICs, FPGAs, or other complex programmable devices. As such, the present invention can be embodied as a computer program stored in a computer readable medium, wherein the computer program comprises program instructions for carrying out the exemplary methods detailed above.

Those skilled in the art should appreciate the broad applicability of the present invention to a variety of control contexts and system types, including electrical and non-electrical systems. As such, the present invention is not limited by the foregoing details but rather is limited only by the scope of the following claims and their reasonable equivalents.

What is claimed is:

1. A method of controlling a multivariable alternative energy system comprising:
    monitoring a plurality of control variables of interest in the system;
    selecting one of the control variables for regulation control and regulating the selected control variable relative to a desired setpoint while continuing to monitor the remaining ones of the control variables; and
    selectively switching regulation control over to one of the remaining ones of the control variables and regulating that control variable relative to a desired setpoint if that control variable is detected as exceeding an allowed value;
    wherein the multivariable alternative energy system is configured to operate from an electrical energy storage device (EESD) and an alternative energy generation device (AEGD), the method further comprising coupling an EESD input of the system to a dc bus through a first power flow control device that controls power flow between the EESD and the dc bus, and coupling an AEGD input to the dc bus through a reverse blocking circuit configured to prevent current flow from the dc bus into the AEGD.

2. The method of claim 1, further comprising storing one or more parameter values for each of the control variables, and configuring a control circuit to use the stored parameter values corresponding to a particular one of the control variables where that particular control variable is selected for regulation control.

3. The method of claim 2, wherein the control circuit comprises a PID controller, and wherein the stored parameter values for each control variable comprise at least one of a proportional gain term, an integral gain term, and a derivative gain term.

4. The method of claim 3, further comprising providing an individual control loop for each control variable, and closing the control loop corresponding to the selected control variable through the PID controller.

5. The method of claim 1, further comprising defining an order of control precedence that determines the particular control variable selected for regulation control if two or more of the control variables are detected as exceeding their allowed values.

6. The method of claim 1, further comprising designating a particular one of the control variables as a default regulation variable, and assigning a lowest control precedence to the default regulation variable.

7. The method of claim 1, wherein selecting one of the control variables for regulation control and regulating the selected control variable relative to a desired setpoint while continuing to monitor the remaining ones of the control variables comprises regulating the selected control variable by controlling the power flow between the EESD and the dc bus responsive to measuring an error between the selected control variable and the desired setpoint for the selected control variable.

8. The method of claim 7, wherein selectively switching regulation control over to one of the remaining ones of the control variables and regulating that control variable relative to a desired setpoint if that control variable is detected as exceeding an allowed value comprises selecting one of the remaining control variables as a new regulation control variable and controlling the power flow between the EESD and the dc bus responsive to an error between a measured value of the new regulation control variable and a corresponding desired setpoint.

9. The method of claim 7, wherein the first power flow device comprises a bi-directional converter that controls bi-directional converter current flow responsive to a duty cycle of an applied switching signal, and wherein controlling the power flow comprises controlling the duty cycle of the switching signal.

10. The method of claim 1, wherein the alternative energy system further comprises an ac inverter that is selectively coupled to an ac electrical system in a grid-parallel mode of operation of the alternative energy system.

11. The method of claim 10, further comprising selectively regulating AEGD current and dc bus voltage by operating the ac inverter as a second power flow device to control power flow between the dc bus and the ac electrical system.

12. The method of claim 11, further comprising, when operating in the grid-parallel mode, selectively regulating EESD voltage and EESD current via the first power flow device, and selectively regulating AEGD current and dc bus voltage via the second power flow device.

13. The method of claim 1, wherein the plurality of control variables comprises an EESD current, an EESD voltage, a dc bus voltage, and an AEGD current, and further comprising defining an order of control precedence for the control variables and selecting the control variables for regulation according to the order of control precedence.

14. The method of claim 13, wherein, in a charging mode of the alternative energy system, defining the order of control precedence as the dc bus voltage, the AEGD current, and either the EESD voltage or EESD current as a function of their values with respect to their maximum settings.

15. The method of claim 13, wherein, in a non-charging mode of the alternative energy system, defining the order of control precedence as the dc bus voltage, and the AEGD current.

16. The method of claim 13, further comprising selecting one of the control variables as a default variable, and setting the default variable to a lowest priority in the order of control precedence.

17. A multivariable control apparatus to control at least a portion of a multivariable alternative energy control system, the apparatus comprising:
a first power flow device to couple an electrical energy storage device (EESD) to a dc bus within the alternative energy control system, the first power flow device being configured to control power flow between the EESD;
a reverse blocking circuit to couple an alternative energy generation device (AEGD) to the dc bus, the reverse blocking circuit being configured to prevent current from flowing into the AEGD from the dc bus;
one or more monitoring circuits configured to generate error signals relative to desired setpoints for a corresponding plurality of control variables of interest in the system; and
a control circuit configured to select one of the control variables for regulation control and regulate the selected control variable based on the corresponding error signal, and further configured selectively to switch regulation control over to any of the remaining ones of the control variables responsive to detecting that any one of the remaining control variables is exceeding an allowed value.

18. The apparatus of claim 17, further comprising one or more storage devices operative associated with the control circuit to store one or more parameter values for each of the control variables, and wherein the control circuit is configured to use the stored parameter values corresponding to a particular one of the control variables where that particular control variable is selected for regulation control.

19. The apparatus of claim 18, wherein the control circuit comprises a PID controller, and wherein the stored parameter values for each control variable comprise at least one of a proportional gain term, an integral gain term, and a derivative gain term.

20. The apparatus of claim 19, wherein the PID controller is configured to provide an individual control loop for each control variable, and to close the control loop corresponding to the selected control variable through the PID controller.

21. The apparatus of claim 17, wherein the control circuit is configured to select control variables according to a defined order of control precedence that determines the particular control variable selected for regulation control if two or more of the control variables are detected as exceeding their allowed values.

22. The apparatus of claim 17, wherein the apparatus the apparatus regulates the selected control variable by controlling the power flow between the EESD and the dc bus responsive to the corresponding error signal.

23. The apparatus of claim 22, wherein the first power flow device comprises a bi-directional converter that controls bi-directional converter current flow responsive to a duty cycle of an applied switching signal, and wherein the apparatus controls the power flow between the EESD and the dc bus by controlling the duty cycle of the switching signal.

24. The apparatus of claim 17, wherein the apparatus further comprises an ac inverter that is selectively coupled to an ac electrical system in a grid-parallel mode of operation of the alternative energy system.

25. The apparatus of claim 24, wherein the apparatus is configured to selectively regulate AEGD current and dc bus voltage by operating the ac inverter as a second power flow device to control power flow between the dc bus and the ac electrical system.

26. The apparatus of claim 25, wherein the apparatus is configured to selectively regulate EESD voltage and EESD current via the first power flow device, and selectively regulate AEGD current and dc bus voltage via the second power flow device, when operating in the grid-parallel mode.

27. A multivariable control apparatus for controlling an alternative energy system, the apparatus comprising:
- a first power flow device to control power flow between an electrical energy storage device (EESD) associated with the system and a dc bus included within the system;
- a reverse blocking circuit to couple an alternative energy generation device (AEGD) to the dc bus and prevent reverse current flow from the dc bus into the AEGD;
- an ac inverter to generate ac power from dc power supplied by the dc bus; and
- a multivariable control circuit to monitor a set of control variables comprising two or more of an EESD voltage, an EESD current, an AEGD current, and a dc bus voltage;
- said multivariable control circuit configured to control the first power flow device in one or more operating modes of the alternative energy system to regulate a selected one of the control variables relative to a corresponding desired setpoint, and to change which control variable is selected for regulation control responsive to detecting that a non-selected control variable is exceeding an allowed value.

28. The apparatus of claim 27, wherein the ac inverter operates as a second power flow device by controlling power flow between the dc bus and an external ac electrical system, and wherein, in a grid-parallel operating mode in which the ac inverter is coupled to the external electrical system, the multivariable control circuit is configured to regulate a selected one of the AEGD current and the dc bus voltage by controlling the second power flow device and simultaneously to regulate a selected one of the EESD voltage and EESD current by controlling the first power flow device.

29. The apparatus of claim 28, wherein the multivariable control circuit comprises a dc control circuit configured to control the first power flow device, and an ac control circuit configured to control the second power flow device.

30. The apparatus of claim 29, wherein the dc control circuit is configured to regulate a selected one of the EESD voltage, the EESD current, the AEGD current, and the dc bus voltage if not in the grid-parallel mode.

31. The apparatus of claim 27, wherein the first power flow device comprises a bi-directional converter that controls current flow between the EESD and the dc bus responsive to a duty cycle of an applied switching signal, and wherein the multivariable control circuit is configured to regulate the selected control variable by controlling the duty cycle of the switching signal.

32. The apparatus of claim 27, wherein the apparatus operates in one or more modes, and wherein the multivariable control circuit is configured to select control variables for regulation control according to a mode-dependent order of precedence.

33. The apparatus of claim 27, wherein the one or more modes include an EESD charging mode, and wherein the multivariable control circuit is configured to monitor the EESD voltage and the EESD current relative to maximum allowed values, and to select one of them for regulation control based on that monitoring.

34. The apparatus of claim 33, wherein the multivariable control circuit is configured to select the EESD current for regulation control in the charging mode if neither the EESD voltage nor the EESD current exceed their respective maximum allowed values.

35. The apparatus of claim 27, wherein the multivariable control circuit is configured to operate in an idle mode where it adjusts the setpoint corresponding to the dc bus voltage to a minimum value such that the dc bus voltage is less likely to be selected for regulation control by making it less likely that the dc bus voltage will fall outside an allowed range.

36. The apparatus of claim 35, wherein the multivariable control circuit is further configured to adjust the setpoint corresponding to the AEGD current such that it permits the AEGD current to rise to a maximum allowed value before attempting to regulate the AEGD current downward.

37. The apparatus of claim 36, wherein the multivariable control circuit is configured to adjust the setpoints corresponding to the dc bus voltage and the AEGD current based on receiving command values from a supervisory control circuit.

38. The apparatus of claim 27, wherein the multivariable control circuit comprises:
- a control loop input circuit for each control variable in the set of control variables;
- a mode select circuit to select a regulation mode based on receiving one or more detection signals from each of the control loop input circuits; and
- a PID regulator circuit configured to generate a control signal for the first power flow device based on an error between the selected control variable and its corresponding desired setpoint.

39. The apparatus of claim 38, wherein the PID regulator circuit is configured to adjust one or more of a derivative gain term, a proportional gain term, and an integral gain term based on the selected control variable.

40. The apparatus of claim 39, wherein the PID regulator circuit is configured to tune its operations for regulating each of the control variables in the set of control variables by setting one or more of the gain terms based on one or more parameters stored for each control variable.

41. The apparatus of claim 38, further comprising a second PID regulator circuit configured to control the ac inverter as a second power flow device, and wherein, when the apparatus is operating in a grid-parallel mode, the multivariable control circuit is configured to regulate a selected one of the EESD current and the EESD voltage by controlling the first power flow device via the first PID regulator circuit, and is configured to regulate a selected one of the AEGD current and the dc bus voltage by controlling the second PID regulator circuit via the second PID regulator circuit.

42. The apparatus of claim 27, wherein the first power flow device comprises a bi-directional converter controller configured to control a bi-directional converter current flowing between the EESD and the dc bus responsive to a duty cycle of the control signal.

43. A computer readable medium storing a computer program for controlling a multivariable alternative energy system, the computer program comprising:

program instructions to monitor a plurality of control variables of interest in the system including two or more of an electrical energy storage device (EESD) current, an EESD voltage, an alternative energy generation device (AEGD) current, and a dc bus voltage;

program instructions to select one of the control variables for regulation control and regulate the selected control variable relative to a desired setpoint while continuing to monitor the remaining ones of the control variables; and program instructions to selectively switch regulation control over to one of the remaining ones of the control variables and regulate that control variable relative to a desired setpoint if that control variable is detected as exceeding an allowed value;

wherein the system includes an ac inverter coupled to an external electrical system and configured to generate ac power from dc power supplied by a dc bus within the system, a first power flow device to couple the EESD to the dc bus and to control power flow between the EESD and the dc bus, and a reverse blocking circuit to couple the AEGD to the dc bus and to prevent reverse current from flowing into the AEGD from the dc bus.

44. The computer readable medium storing the computer program of claim 43, wherein the computer program further comprises program instructions to select which ones in the set of control variables are subject to regulation control, and to set an order of selection preference for them based on an operating mode of the alternative energy system.

45. The computer readable medium storing the computer program of claim 43, wherein the program instructions to regulate the selected control variable relative to a desired setpoint while continuing to monitor the remaining ones of the control variables comprise program instructions to effect regulation control of the selected control variable by controlling the power flow between the EESD and the dc bus via the first power flow device.

46. The computer readable medium storing the computer program of claim 45, further comprising program instructions to regulate a selected one of the EESD current and the EESD voltage by controlling the first power flow device, and program instructions simultaneously to operate the ac inverter as a second power flow device to thereby control power flow between the dc bus and the external electrical system, and to regulate a selected one of the AEGD current and the dc bus voltage via the second power flow device.

* * * * *